United States Patent [19]
Pawloski

[11] Patent Number: 5,426,769
[45] Date of Patent: Jun. 20, 1995

[54] SYSTEM AND METHOD FOR PRODUCING INPUT/OUTPUT EXPANSION FOR SINGLE CHIP MICROCOMPUTERS

[75] Inventor: Martin B. Pawloski, Scottsdale, Ariz.

[73] Assignee: MetaLink Corp., Chandler, Ariz.

[21] Appl. No.: 112,847

[22] Filed: Aug. 26, 1993

[51] Int. Cl.[6] .......................... G06F 9/00; G06F 13/00
[52] U.S. Cl. ............................. 395/500; 364/DIG. 1; 364/DIG. 2
[58] Field of Search ............... 395/275, 325, 425, 400, 395/800, 500, 375

[56] References Cited

U.S. PATENT DOCUMENTS

| | | | |
|---|---|---|---|
| 4,153,933 | 5/1979 | Blume, Jr. et al. | 395/325 |
| 4,782,439 | 11/1988 | Borkar et al. | 395/425 |
| 4,809,167 | 2/1989 | Pawloski et al. | 395/500 |
| 4,878,174 | 10/1989 | Watkins et al. | 395/375 |
| 4,939,637 | 7/1990 | Pawloski | 395/800 |
| 5,067,077 | 11/1991 | Wakimoto et al. | 395/400 |
| 5,243,700 | 9/1993 | Larsen et al. | 395/275 |

Primary Examiner—Parshotam S. Lall
Assistant Examiner—Ted Wolfe

[57] ABSTRACT

A microcomputer system providing high performance access to external Special Function Registers (SFRs), has an 8051 architecture microcontroller modified such that the instruction stream can be externally examined and decoded by an external expansion decoder. The instruction stream can be examined and decoded regardless of whether the microcontroller fetches instructions from an internal program memory or an external program memory. Every State 6, Phase 2, data on the internal bus of the modified microcontroller is transferred to the PORT2 pins and is available to the external expansion decoder. During reset the microcontroller latches the state of the EA pin to internally determine whether to operate in ROM or ROMless mode. Thereafter, EA operates as a bi-directional control pin that, as an output, signals whether the current bus cycle is an instruction fetch, and, as an input, signals whether the microcontroller shall read the data present on a certain set of I/O pins in order to complete an SFR read operation. The expansion decoder determines whether the current instruction is one which may operate on an SFR, and if so it further decodes the SFR address associated with the current instruction, and produces appropriate read and write control signals for accessing an external SFR. The expansion decoder may contain either a fixed or programmable table of valid external SFR addresses. External SFR addresses represent peripheral functions, increased data memory or both. The system reduces the number of cycles required to access an external device in an 8051 architecture system by providing access to external devices as if they were architecturally internal devices.

19 Claims, 11 Drawing Sheets

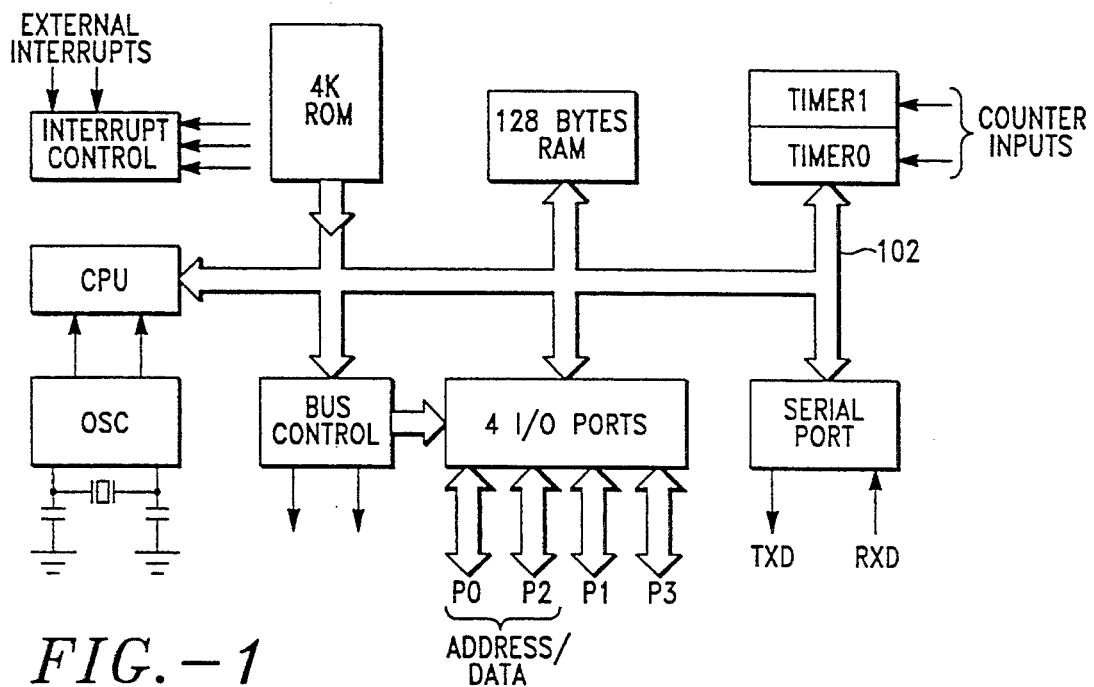
FIG.—1
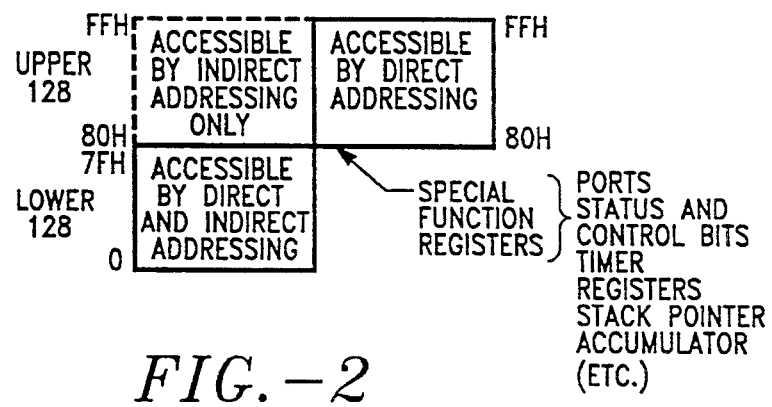
FIG.—2

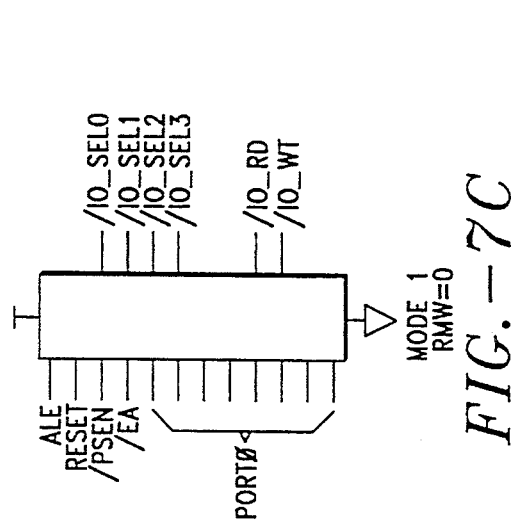
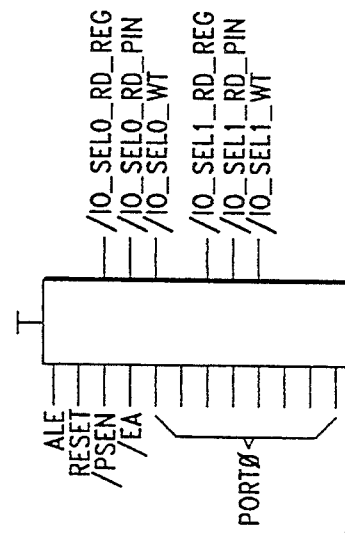
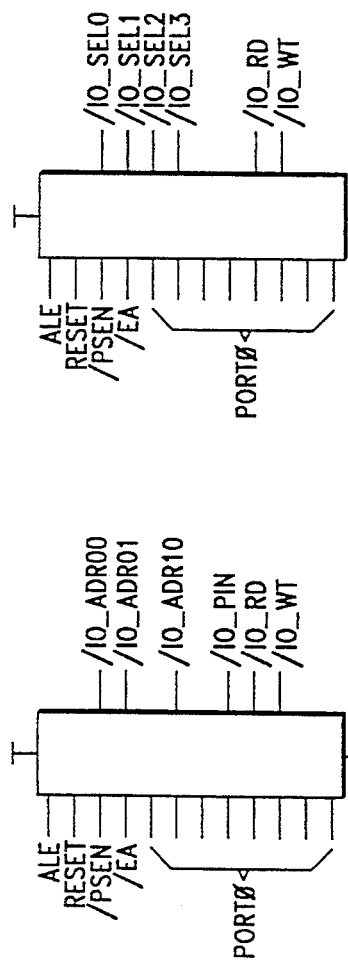
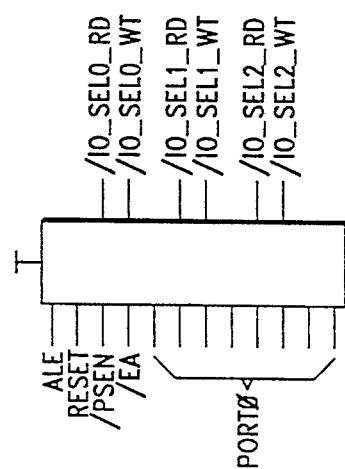
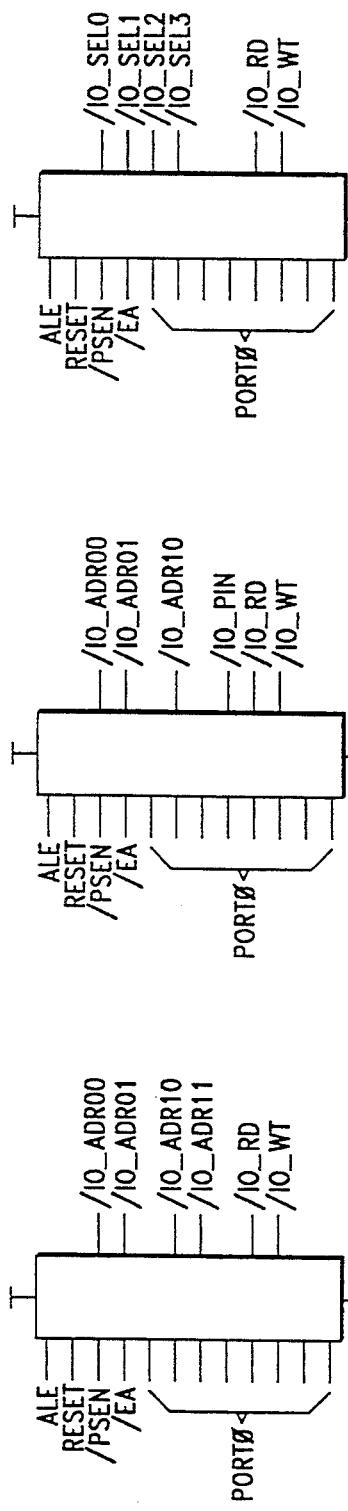
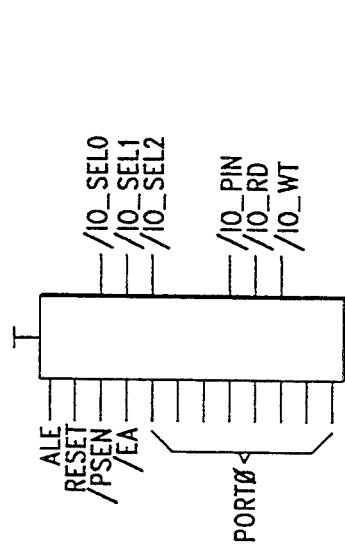

SYSTEM AND METHOD FOR PRODUCING INPUT/OUTPUT EXPANSION FOR SINGLE CHIP MICROCOMPUTERS

BACKGROUND OF THE INVENTION

1. Field of the Invention

The present invention relates generally to microcomputer architecture and to a system and method for producing input/output expansion for single-chip microcomputers. More particularly, the present invention relates to a system for permitting addressable peripheral functions associated with dedicated internal addresses of a microcontroller to exist physically external to a microcontroller and yet interface to the program being executed by the microcontroller as if they were internal to the microcontroller.

2. Related Art

Soon after the development of the microprocessor, semiconductor process technology advanced to the point where it became possible to integrate enough Read Only Memory (ROM) and Random Access Memory (RAM) on a single chip, along with a Central Processing Unit (CPU) to make a useful single-chip microcomputer. These single-chip microcomputers are often referred to as microcontrollers. Typically, a microcontroller includes a ROM for storing one or more software programs, RAM for storage of variables used by the program(s) during operation, a CPU for performing various arithmetic and logical functions and a plurality of Input/Output (I/O) lines. These I/O lines are often viewed in groups of eight and the groups are referred to collectively as I/O ports, or simply ports. Sometimes individual I/O lines are referred to as port pins. Microcontrollers also often include on-chip peripheral functions such as timers, counters, serial or parallel communication channels, A/D converters, and D/A converters. Representative examples of microcontrollers described above are the well-known 68HC11 (manufactured by Motorola Corp.) and the 8051 family of microcontrollers (manufactured by Intel Corporation of Santa Clara, Calif., Signetics Corporation of Sunnyvale, Calif. (Signetics is also known as Phillips Semiconductor), and others). As a particular example, the 8052 microcontroller, a member of the 8051 microcontroller family, includes in addition to a CPU, a 256 byte RAM, an 8192 byte ROM, an interrupt controller, a full duplex Universal Asynchronous Receiver/Transmitter (UART), three 16 bit timer/counters, and four 8 bit general purpose I/O ports. FIG. 1 is a block diagram showing the architecture of the 8051.

The 8051 family uses what is called a Harvard architecture. That is, program code memory and data memory are separated into different address spaces. The 8051 family further distinguishes between internal data memory and external data memory. A map of internal data memory is shown in FIG. 2. The three portions of internal data memory are called the lower 128, the upper 128, and the SFR space. The SFR space can only be accessed directly, and any access to an SFR includes always having the SFR address on the instructions bus. Internal data memory addresses are eight bits wide which generally implies an address space of 256 locations. SFRs include the PORT latches, timers, peripheral controls and so on.

Microcontroller peripheral functions are typically controlled by accesses to (i.e., read and or write transactions with) a set of on-chip registers that provide control bits, flags and data transfer between the peripheral function and the on-chip CPU. These peripheral function control registers are typically dedicated internal addresses. They are designed that way to optimize performance. In the case of the 8051 family of microcontrollers, the dedicated internal addresses used to access the peripheral functions are called Special Function Registers (SFRs). Transactions with SFRs (i.e., reading from and writing to SFRs) are done completely internal to 8051 family microcontroller chips, with no external visibility. As shown in FIG. 2, the 8051 family architecture provides 128 dedicated internal addresses which are set aside for SFRs. Only a small number of these 128 addresses are typically used in any particular 8051 family device. For example, the 8052 device described above uses only 26 SFRs to handle all its peripheral functions. In summary, with respect to 8051 architecture microcontrollers, SFRs and external memory reside in different address spaces and the software required to access SFRs is different from the software necessary to access external memory. This architectural scenario exists for other microcontrollers as well.

When a microcontroller is used in a particular application, additional peripheral functions are typically added to the system in order to customize it. These additional peripheral functions are, of necessity added external to the microcontroller. If the microcontroller used in the system is an 8051 microcontroller, it is currently impossible to access these external peripheral functions using the high performance SFR access method. Instead, the external peripheral functions are required to be mapped to the External Data Memory space. Accessing the External Data Memory space is slow and cumbersome as compared to accessing the SFR space.

In order to illustrate the performance differential between accessing a peripheral function in SFR space and a similar peripheral function in External Data Memory space, two program segments that perform the same function are presented in Tables I and II below. Both program segments test a bit in a control register, and if set, each of the program segments then directs the reading of data from a Buffer Register followed by a store operation to a RAM-based variable. Table I shows how this function is accomplished in SFR space, and Table II shows how this function is presently accomplished when the control register of the peripheral function is in external data memory space.

TABLE I

| | |
|---|---|
| JNB status_flag, not_done | 2 cycles |
| MOV variable, data_register | 1 cycle |
| total cycles for conventional internal access | 3 cycles |

TABLE II

| | |
|---|---|
| MOV DPTR, #status_address | 2 cycles |
| MOVX A, @DPTR | 2 cycles |
| JNB acc.status_flag, not_done | 2 cycles |
| MOV DPTR, #data_register_address | 2 cycles |
| MOVX A, @DPTR | 2 cycles |
| MOV variable, A | 1 cycles |
| total cycles for conventional external access | 11 cycles |

Note that eleven machine cycles are required for the program segment using an external-memory-space-based status flag and data register, while only three machine cycles are used with an SFR-space-based status flag and data register. Additionally, it should be noted that the code density for the program segment using an external-memory space-based status flag is poor compared to the code density of a program segment using an SFR-space-based status flag.

In view of the significant performance gap between operations performed on internal data memory and external data memory, there is a need for a system and method to access physically external memory and I/O devices as if they were mapped into SFR space.

A system for treating external registers of peripheral functions as if they were a part of the internal fast access memory space of a microcontroller is disclosed in U.S. Pat. No. 4,878,174 issued to Watkins, et al. The disclosure of Watkins, et al., teaches the desirability of treating external memory, or peripheral device control registers, as if they were part of the internal fast access memory space. Watkins, et al., at col. 2, lines 39-45 describes "adding the registers associated with these dedicated functions to the internal register file of the microcomputer." FIG. 3 of Watkins, et al., shows the addition of a dedicated port to a microcontroller in order to effectively couple a corresponding external memory or peripheral control register to the internal bus of the microcontroller. More specifically, Watkins, et al., appear to teach adding a register, register address decoding logic, port pads and input/output buffers to the same substrate on which the microcontroller is formed. This dedicated port would then be coupled to an external dedicated logic block. However, not only does this approach require additional pins on the microcontroller and a special package to accommodate those pins, more importantly this approach requires a customized chip. This method also seems to be limited because over 800 additional pins would be required to implement the full set of available SFR addresses, and such packaging either does not exist or is too expensive to implement for a low-cost microcontroller system.

Although many peripheral functions in a system are added external to the microcontroller, continuing advances in semiconductor technology now permit the incorporation of some of these external peripheral functions onto the same substrate in which the microcontroller itself is formed. Generally, an ASIC design approach is used to produce such a microcontroller with a unique set of peripheral functions. ASIC design methodology can reduce the time to market for an IC, but the tradeoff is generally a less efficient logic and layout design than could have been achieved by skilled human IC designers. Although quick time to market is very important in this industry, a particularly troubling aspect of this design approach is the large chip size which results since manufacturing yield is inversely proportional to chip size. Also, it is difficult and time-consuming to simulate a large, complex design with currently existing software simulation tools.

Furthermore, microcontrollers of the type discussed herein are typically found in embedded applications. That is, unlike a computer system designed to communicate with a user, these microcontrollers often form a substantial part of a low-cost control system which does not have facilities for communicating with a user. This tends to make the debugging portion of a product development cycle more difficult. One solution created to address this problem is the in-circuit emulator (ICE). The ICE is typically comprised of hardware and software. The ICE permits the development engineer to monitor and analyze the activity of a microcontroller as it operates in a target system. Unfortunately, some of the commercially available microcontrollers do not provide a straightforward way to access data and signals that exist internal to the microcontroller. Consequently, microcontroller manufacturers responded by providing a special, more costly to produce, version of the microcontroller called a bond-out chip. The bond-out chip contained extra bonding pads, buffers, and signal interconnect, and typically required a different package. The bond-out chips can be used in an ICE so that activity internal to the microcontroller is easy to monitor.

A lower cost solution to the problem of observing internal activity of the microcontroller involves using a standard microcontroller, (i.e., not a bond-out chip) and recreating, external to the microcontroller, some of its I/O ports and registers. However, recreation of, for example, PORT0 and PORT2 for emulation of 8051 family microcontrollers has conventionally required a substantial amount of circuitry. For a discussion of circuitry used in supporting emulation of single-chip microcontrollers see U.S. Pat. No. 4,939,637 issued to Pawloski, and incorporated herein by reference as if fully set forth below.

What is needed is a system and method for treating memory and/or peripheral device control registers which are not integrated onto a single-chip microcomputer as if they were part of the internal address space. In this way read/write transactions with physically external memory and peripheral control registers can be accomplished with greater speed and higher code density. What is further needed is a system and method for expanding the amount of data memory that can be used by a microcontroller. What is still needed is a system and method for supporting emulation of single-chip microcontrollers. What is still further needed is a system and method for supporting low-cost, fast prototyping of ASIC microcontrollers.

SUMMARY OF THE INVENTION

Accordingly, it is an object of the present invention to provide a microcontroller system wherein dedicated internal addresses can be used to access hardware that is physically external to the microcontroller chip, without a degradation in performance as compared to corresponding on-chip accesses.

It is a further object of the present invention that instructions that operate on dedicated internal addresses will operate in the same manner on the dedicated internal addresses that reside external to the microcontroller chip.

It is a further object that the cycle timing of all instructions that operate on dedicated internal addresses will be the same regardless of whether the dedicated internal address is integrated on the microcontroller or resides external to the microcontroller.

Briefly, the present invention provides a system and method for expanding memory, I/O capabilities, and peripheral functionality of 8051 architecture computer systems. The system or the present invention, as shown in FIG. 3, contemplates three major blocks. The first block is a microcontroller 302 having a slightly modified 8051 architecture. The second block is an expansion decoder 364, and fie third block is made up a family of expansion devices 306-314 for use in conjunction with the modified 8051 microcontroller 302 and expansion decoder 304.

Referring to FIGS. 4A and 4B, microcontroller 302 having an 8051 architecture is modified such that it can efficiently interface and interact with the above-noted expansion decoder and expansion devices. These modifications include changing the functionality of the EA line 320 so that the state of this signal is latched during reset of microcontroller 302. A latch 404 is provided this purpose. This internally latched value is used to determine whether to operate in ROM or ROMless mode. After reset, EA operates as a bi-directional control pin that, as an output indicates whether the current bus cycle is an instruction fetch, and, as an input, specifies that the microcontroller shall read the data present on a certain I/O port. A further modification is that, when operating in this enhanced mode, the data on the internal bus of microcontroller 302 is transferred to the PORT2 pins every State 6 Phase 2. In this way the internal write data stream is available to an external expansion device.

A still further modification is to include a bit 406 within microcontroller 302 of the present invention, the state of which is indicative of whether the microcontroller shall operate in a normal ROM or ROMless mode, or in an enhanced ROM or ROMless mode. In the normal modes the microcontroller would operate as one or the 8051 family architecture microcontrollers. In the enhanced mode, the hardware changes of the present invention cause the operation of the microcontroller to be modified as discussed in the previous paragraph. Of course, whether instruction are fetched from internal or external program memory does not affect the timing relationship between microcontroller 302 and expansion decoder 304. Selection of normal versus enhanced mode can be done by writing a code into the microcontroller during the reset period that is latched internally, and decoded to select the mode of operation. Alternatively, rather than actually writing a code to the microcontroller, predetermined voltage levels can be applied to pins such as ALE and PSEN during the reset period. These voltage levels are decoded to determine which mode of operation has been selected. Circuits for decoding predetermined voltage levels in this way are well known to VLSI circuit designers of ordinary skill. A further alternative, as shown in FIG. 4A, is to provide input signals of both ALE and a port pin, e.g., P2.7, logically combine these signals, and store the result during reset into latch 406.

Expansion decoder 304 determines whether the presently fetched instruction is one which may operate on an SFR address, and if so, it further examines and decodes the SFR address associated with the current instruction. If the SFR address is one which is physically external to the 8051, Expansion Decoder 304 produces the appropriate read and/or write control signals for accessing the external SFR. Expansion Decoder 304 may contain either a fixed or programmable table of valid external SFR addresses. External SFR addresses represent devices which provide the microcomputer system with additional peripheral functionality, increased data memory or both. By providing the means to access external devices as if they were architecturally internal devices, the present invention reduces the number of clock cycles conventionally required to access an external device in an 8051 architecture system. Since reduced cycle time is achieved for transactions with external registers, microcontroller 302 of the present invention can be run at a lower clock speed and still provide performance equivalent to a conventional microcontroller tutoring at higher speed. This ability can be used to reduced power consumption. An internal block diagram of the Expansion Decoder is shown in FIG. 5.

Expansion I/O devices 306-314, as contemplated herein, refer to a family of circuits which are operable in the system of the present invention. Expansion I/O devices 306-314, although physically external to microcontroller 302, are accessed by the SFR access mechanism thereby effectuating high performance operation notwithstanding their existence being physically separate from microcontroller 302, i.e., not fabricated on the same substrate as microcontroller 302. An expansion I/O device 306-314 may be a low complexity circuit such as an addressable input poll 314, or an addressable output port 312. An expansion I/O device 306-314 may be a moderate complexity circuit such as an addressable input/output port combined with a small amount of addition logical functionality 310, or an addressable analog-to-digital or digital-to-analog converter (not shown). An expansion I/O device 306-314 may be a highly complex circuit such as a multi-function device containing expansion memory, timers, counters, interrupt logic and other special functions defined by a user. FIG. 3 shows the general architectural features of Expansion I/O device 306-314 according to the present invention.

An advantage of the present invention is that a large number of storage locations that are physically external to the microcontroller chip can be incorporated into the dedicated internal address space.

A further advantage is that an in-circuit emulator embodying the present invention can be realized without the use of a special bond-out microcontroller chip.

A further advantage of the present invention is reduced power consumption that results from increased program code density.

A further advantage of the present invention is reduced RF emissions and easier certification by the United States Federal Communications Commission of products containing the present invention. This advantage results from the fact that certain functions can be achieved more time-efficiently and therefore the microcontroller can be run at lower clock speed and still achieve a level of functionality requiring higher clock speeds from conventional microcontroller systems.

A further advantage of the present invention is that the dedicated internal addresses provided external to the microcontroller chip can be used as the status, control and data registers of peripheral functions.

A further advantage of the present invention is that the dedicated internal addresses provided external to the microcontroller chip can be used as the address and data registers of RAMs.

A further advantage of the present invention is the ability to build a microcontroller in-circuit-emulator without a bond-out version of the microcontroller.

Other objects and advantages together with a fuller understanding of the invention will become apparent and appreciated by referring to the following description and claims taken in conjunction with the accompanying drawings.

BRIEF DESCRIPTION OF THE DRAWINGS

FIG. 1 is a block diagram showing the architecture of a conventional microcontroller of the 8051 family.

FIG. 2 is a memory map diagram of the 8051 family architecture internal data memory.

FIGS. 7A-7F show alternative implementations of peripheral function control signal encoding.

DETAILED DESCRIPTION OF THE INVENTION

1.0 Terminology

Figure 3:
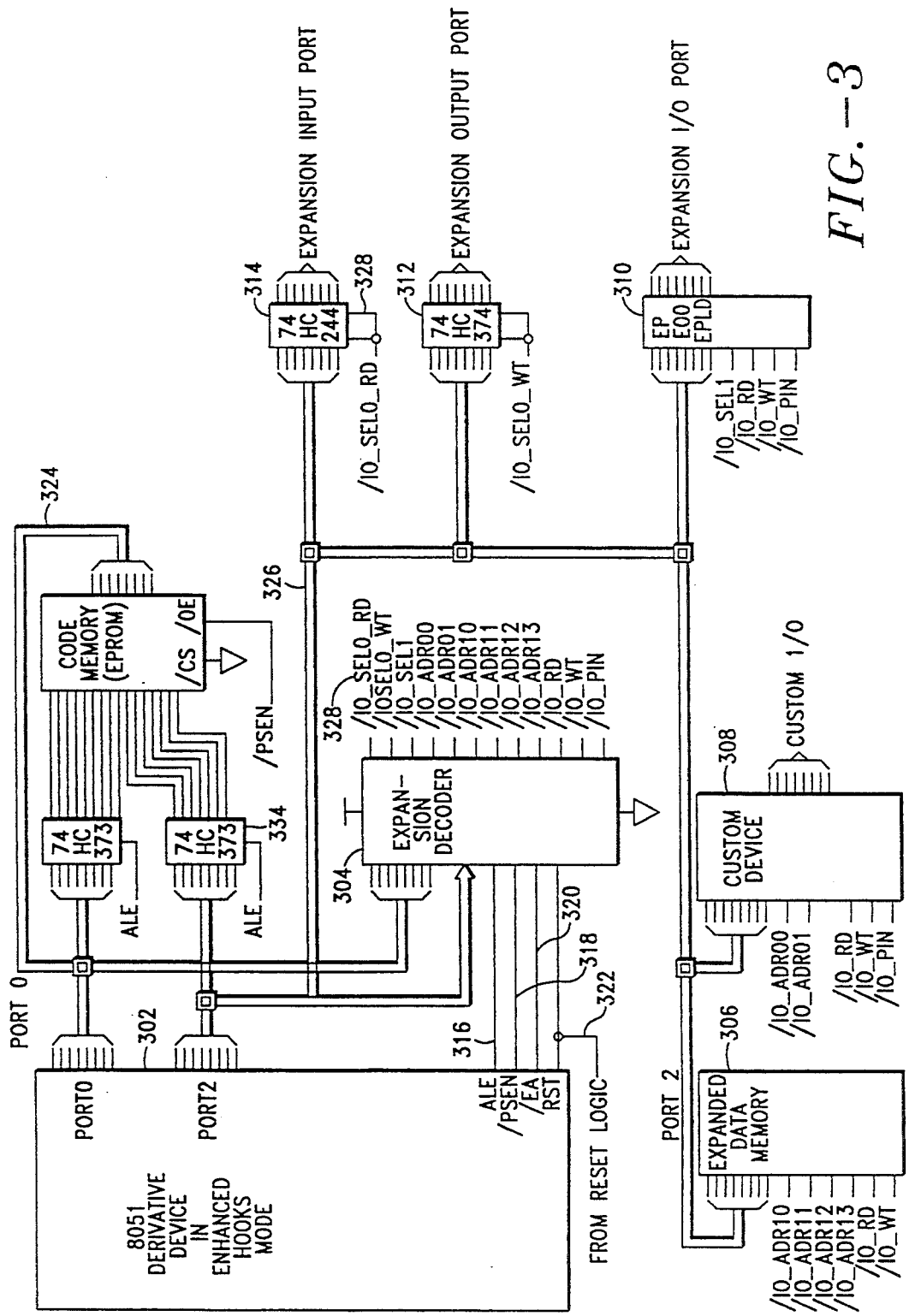
FIG. 3 is a block diagram of a computer system embodying the present invention.
Figure 4A:
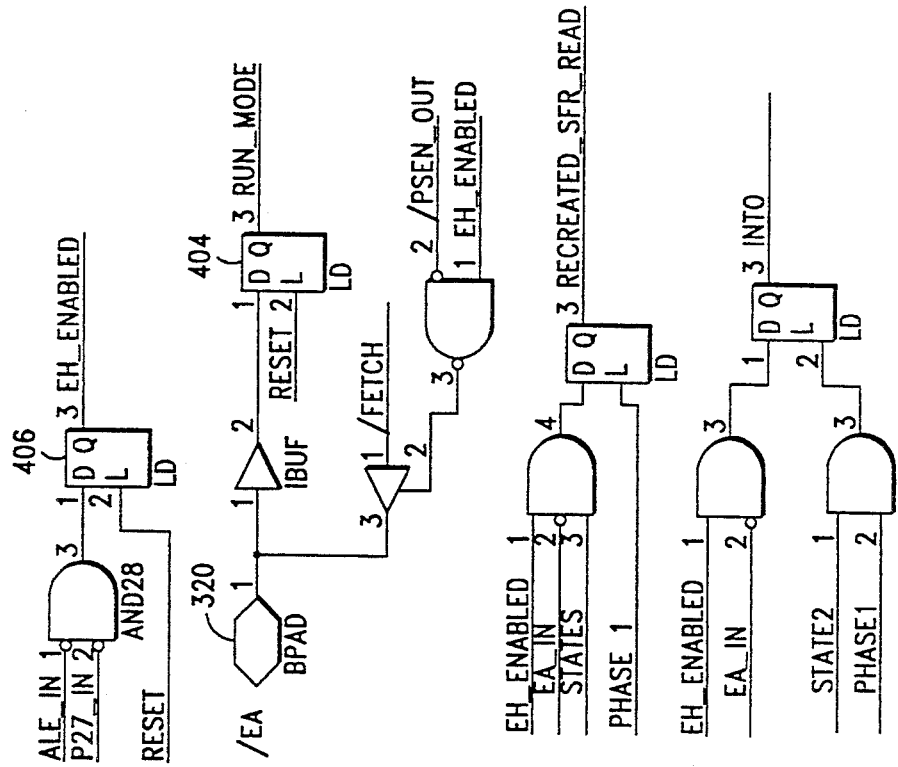
FIGS. 4A-4B are logic diagrams showing circuitry for entering enhanced mode operation as well as for generating necessary control signals.
Figure 4B:
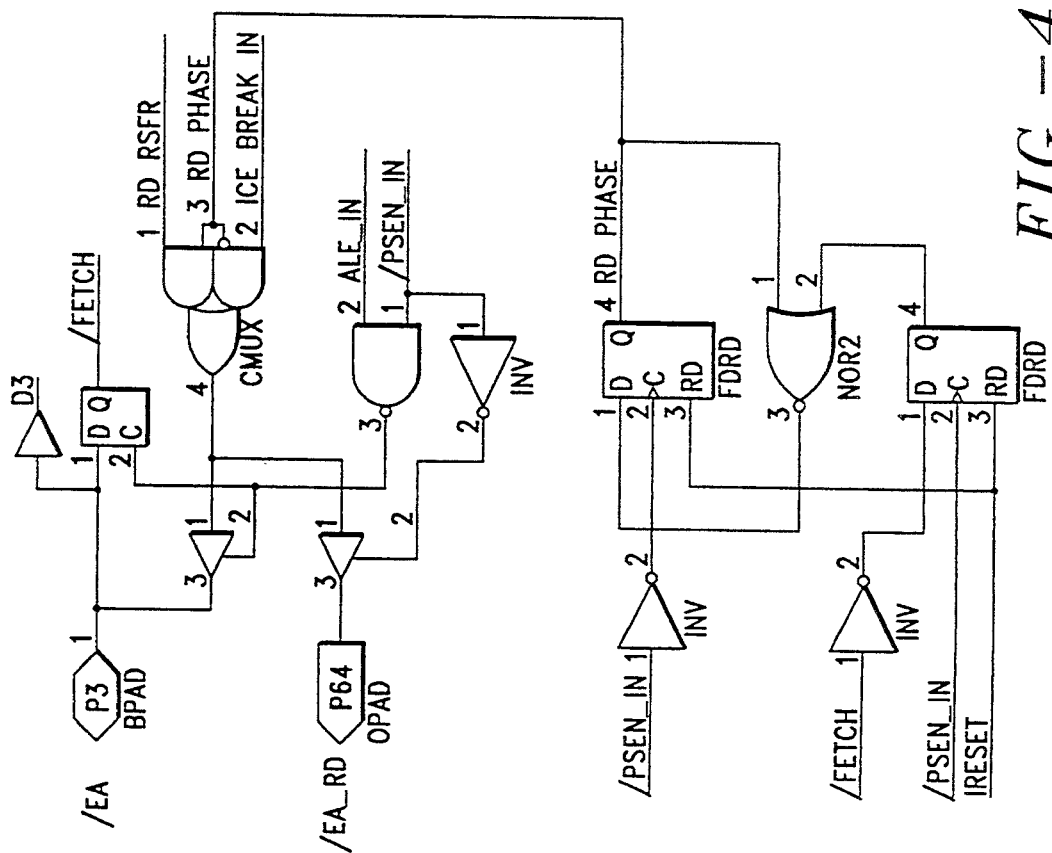

This section is intended to clarify language use by providing alternative terms for some of the expressions used herein, where such alternative terms are known to exist. The lists of alternative terms and expressions are not necessarily exhaustive, nor are they intended to be interpreted as limiting the scope of the invention, or range of equivalents in any way.

The terms chip, semiconductor device, integrated circuit (IC), monolithic integrated circuit, microelectronic device, and similar variants are used interchangeably herein, and microelectronic device is considered to be the broadest term, encompassing the others. Additionally, chip, microchip, and die all refer to a single piece of semiconductor material (usually silicon). With respect to these microelectronic devices, signals are coupled between them and other circuit elements via physical, electrically conductive connections. The point of connection is sometimes referred to as an input, output, terminal, line, pin, pad, port, interface, or similar variants and combinations. Those of ordinary skill in this field will recognize these terms, variants and equivalents.

The term byte is used, as is conventional in this field, to mean eight bits.

The acronym ASIC stands for Application Specific Integrated Circuit. At this time in the semiconductor industry, ASIC has come to mean an integrated circuit whose function is particularly designed to meet a customer's application, and more particularly it has come to mean an IC design approach which obviates full custom (i.e., handcrafted) integrated circuit design. Typical examples of ASIC design include logic synthesis software in combination with routing software for specifying the interconnection of gates in a gate array, or the selection and interconnection of logic cells from a cell library.

The terms single-chip microcomputer, microcontroller, embedded controller, embedded processor and similar variants are often used interchangeably in this field and are generally meant to include single-chip digital data processing devices such as those exemplified by the 8051 family of microcontrollers. More particularly, and depending on context, the term 8051 can be used either to refer to the whole family of microcontrollers that execute the well-known 8051 instruction set, regardless of manufacturer, memory size, number and type of peripheral functions, or the size and form of package; or it can be used specifically for a particular instance of the 8051 family. The term 8051 is used herein to refer to all family members that execute the 8051 instruction set.

The term peripheral function refers to circuits, or devices, that have functions usually considered peripheral to those of the CPU in a computer system. For example, a Universal Asynchronous Receiver/Transmitter (UART), a Direct Memory Access (DMA) controller, a Counter/Timer, or other such devices are typically referred to as peripheral devices, or peripheral functions (or sometimes as peripheral function devices). These peripheral devices typically have registers which are read and/or write accessible by the CPU (i.e., microprocessor or microcontroller) of the system. The aforementioned registers are used within the peripheral devices to hold data for command, mode, status, data reception, data transmission, and similar functions. Conventionally, the CPU communicates with peripheral devices by reading and writing the peripheral device registers. In this field of endeavor, the term Special Function Register (SFR) is often used interchangeably with peripheral function The terms Expansion I/O port, Expansion I/O device, peripheral function, and SFR address are, depending on the context, used interchangeably. The Expansion I/O ports of the present invention are read and written by accessing a physically external SFR address.

A computer, whether a large or small system, a microprocessor or a microcontroller, is often referred to, in this field, as a machine. For example, the "state of the machine" generally refers to the logical state of the computer as manifested by the state of substantially all the storage bits therein. Additionally, both complete computer systems and CPUs are sometimes referred to broadly as programmed data processors. The term, programmed data processor, is used herein to encompass all manner of computing, or data processing, elements such as microprocessors, microcomputers, and any functionally equivalent device or system.

Enhanced mode is used herein to refer to a mode of operation of the microcontroller of the present invention. In enhanced mode the instruction stream and internal write data stream are available for external examination, and the EA signal pin becomes a bi-directional control signal pin.

Positive logic is used in the description of the logical circuits and operation of the present invention. In other words, signals are inactive (or deasserted) when they are in a low state, and active (asserted) when they are in a high state. When a signal name used herein is preceded by a slash (/), that signal is low active, that is, asserted when in a low state, and deasserted when in a high state.

Discussions of power consumption herein all refer to the relationship $P=CV^2f$ wherein P is power, C is capacitance, V is voltage, and f is frequency. It can be seen that power is directly proportional to both frequency and the magnitude of the capacitance that must be charged and discharged. Power is proportional to the square of the voltage.

2.0 8051 Machine Cycles and Bus Timing

In order to understand the detailed operation of the present invention, it is necessary to be familiar with the internal state timing of the standard 8051 implementation as well as the bus timing for program fetches and data transfers. A discussion of this timing can be found in Chapter 5 of "8-Bit Embedded Controller Handbook", Intel Corp., 1989, portions of which are adapted below.

In 8051 family devices, an internal clock generator defines the sequence of states that make up the machine cycle. A machine cycle consists of a sequence of 6 states, referred to as S1 through S6. Each state time lasts for two oscillator periods. Thus a machine cycle takes 12 oscillator periods or 1 microsecond if the oscillator frequency is 12 MHz.

Each state is divided into two halves, a Phase 1 and a Phase 2, respectively referred to as P1 and P2. Normally two program fetches are generated during each machine cycle, even if the instruction being executed does not require it. If the instruction being executed does not require more code bytes, the CPU simply ignores the extra fetch, and the Program Counter is not incremented.

Execution of a one-cycle instruction begins during State 1 of the machine cycle, when the opcode is latched into the instruction register. A second fetch occurs during S4 of the same machine cycle. Execution is complete at the end of S6 of this machine cycle.

The MOVX instruction takes two machine cycles to execute. No program fetch is generated during the second cycle of a MOVX instruction. This is the only time program fetches are skipped.

The fetch/execute sequences are the same whether the Program Memory is internal or external to the chip. Execution times do not depend on whether the program memory is internal or external. If program memory is external the signal /PSEN is normally asserted twice per machine cycle (i.e., all of S3 and the first half of S4, and all of S6 and the first half of S1).

For access to external data memory, two /PSENs are skipped because the address and data bus are being used for the data memory access. A data memory access takes twice as long as a program memory bus cycle.

Internal data address is on the internal bus (IB) during S4P2. Internal read data is on the IB during S5P2. Internal write data is on the IB during S6P2.

EA gated S5P2 is used for external SFR read data.

3.0 Internal Data Memory and Special Function Register Address Space

The 8051 family uses what is called a Harvard architecture. That is, program code memory and data memory are separated into different address spaces. The 8051 family further distinguishes between internal data memory and external data memory. A map of internal data memory is shown in FIG. 2. The three portions of internal data memory are called the lower 128, the upper 128, and the SFR space. The SFR space can only be accessed directly, and any access, to an SFR includes always having the SFR address on the instructions bus. Internal data memory addresses are eight bits wide which generally implies an address space of 256 locations. SFRs include, but are not limited to, PORT latches, timers, peripheral controls and the like.

4.0 Overview

The present invention, having a modified 8051 architecture microcontroller 302, an external Expansion Decoder 304, and at least one external Expansion I/O Device 366–314, allows the addresses of SFRs to be mapped externally from microcontroller 302 and also allows them to be accessed as if they were on-chip. (The external Expansion I/O Devices are also referred to herein as Expansion I/O Ports.) Thus, an 8051 family member part like the 80C451, which uses 23 out of 128 SFR addresses, would be able to directly access up to 105 (i.e., 128-23) expansion I/O ports.

There are three major functions incorporated into the present invention, and associated with the aforementioned three major blocks. The first major function is latching instructions and SFR addresses and decoding them. Logic external to the microcontroller 302 is coupled to PORT0 data bus 324 and is operable to latch instructions and SFR addresses as they are read from code memory during program execution. All instructions that operate on SFRs are fully decoded by this external logic to determine read, write, read-modify-write, bit and address sequencing. Additionally, all SFR addresses are decoded to determine if an Expansion I/O port 306–314 is being addressed. This function of decoding instructions and SFR addresses is contained in a single logical block called the Expansion Decoder.

As discussed in the Background section above, U.S. Pat. No. 4,878,174 to Watkins, et al., discloses treating external registers as part of the internal memory address space. However, it can be seen in FIG. 3 of Watkins, et al., that an extra port is to be added for each new external register in order to provide a connection for that register to the internal data bus of the microcontroller. Of course, extra pins and packaging resources are required to incorporate these additional ports. The present invention is quite different in that no costly additional pins are needed. The architecture of Watkins, et al., is limited by the number of pins that can physically be implemented. Another disadvantage of the Watkins, et al., architecture is that the additional ports produce extra parasitic loading on the internal bus which limits the maximum clock rate that can be achieved and also requires that more power be consumed during the charging and discharging of this extra parasitic capacitance.

The present invention is far more flexible than Watkins, et al., in that the number of external SFRs can be (1) large, and (2) easily changed. The present invention takes advantage of the 8051 architecture internal timing and small circuit changes in the PORT0 and PORT2 logic to provide the contents of the internal bus to the outside world. In this way, the Expansion Decoder is able to facilitate high-efficiency communication between the microcontroller and a large number of external peripheral functions.

The second of the three major functions is providing for data movement between Expansion I/O ports 306–314 and microcontroller 302. This is accomplished by coupling PORT2 to an I/O Expansion Bus 326. PORT2 multiplexes its I/O Expansion Bus 326 duties with its conventional function of outputting the high byte of address.

The third major function is providing a bidirectional control signal pin on microcontroller 362 that signals the type of memory transaction that is in progress. More particularly, this pin, as an output signal specifies whether the current fetch cycle is the first fetch (i.e., the opcode byte) of an instruction. This output signal is received, in the present invention, by expansion decoder 304 and used to facilitate the synchronization of expansion decoder 304 to microcontroller 362. As an input this pin is driven with a signal which is indicative of whether external data is to be read. In the preferred embodiment, the /EA pin 320 is used for this bidirectional control signal pin.

5.0 Structural Description

5.1 The Modified 8051 Architecture

All of the three functions noted above are accomplished with only minor changes to the conventional functionality of PORT0, PORT2, and /EA pin 320. No other conventional functions or characteristics of the microcontroller are changed. As mentioned above, in operation /EA will indicate when an instruction fetch cycle is occurring, this can provide substantial savings with respect to the amount of logic (a sequencer, for example) required to synchronize microcontroller 302 to expansion decoder 304.

The enhanced mode of operation may be controlled, that is selected, via software by using a bit in an on-chip SFR. Enhanced mode may also be selected by applying a predetermined combination of voltages to certain pins during reset. When enhanced mode is enabled the microcontroller operates normally except for the following changes:

1) All code memory accesses are forced external. Since Expansion Decoder 304 needs to monitor the instruction stream, this is a simple and straightforward way of achieving instruction stream visibility external to microcontroller 302. This embodiment also minimizes the amount of change that must be made to an existing microcontroller architecture to achieve the aforementioned instruction stream visibility.

2) PORT0 and PORT2 on-chip addresses are disabled. That is, any instruction that uses PORT0 or PORT2 SFR addresses will operate as if those PORTS were not implemented. This effectively makes PORT0 and PORT2 external SFR addresses. (This is an important feature for building in-circuit emulators, as well as Multi-Chip Modules (MCM) containing a microcontroller and a non-volatile memory such as an EPROM.)

3) The PORT2 SFR is written to every S6P2. This allows the data from any write instruction to be captured and stored for later output.

4) The PORT2 SFR drives the PORT2 pins every S1. This allows the data captured as described above to be made available externally and conditionally latched into an Expansion I/O Port.

5) The PORT2 pins are sampled every S4P2. This allows data from any Expansion I/O Port 306–314 to be captured and stored for later transfer to Internal Bus 102 (microcontroller internal bus) of microcontroller 302.

6) The sampled PORT2 pins are conditionally driven onto microcontroller internal bus 102 during S5P2.

7) Pin /EA 320 becomes a bi-directional control signal. In accordance with the present invention, pin /EA 320 is an output when /PSEN 318 is low and an input when /PSEN 318 is high. When /PSEN 318 is low, microcontroller 302 will drive pin /EA 320 low when the current memory access is the first access of a new instruction (i.e. the instruction fetch cycle). This ensures that Expansion Decoder 304 will remain synchronized to microcontroller 802. When /PSEN 318 is high, Expansion decoder 304 will drive /EA 320 low when the current instruction requires a read (i.e., input) from an Expansion I/O port 306–314. Assertion of /EA 320 during S5 will result in the microcontroller PORT2 logic driving the PORT2 pin data that was sampled during S4P2 onto microcontroller internal bus 102.

Since the address/data functionality of PORT0 does not change, all memory accesses are identical to the standard ROMless mode timings. Standard EPROMs, or EPROM chip(s) in an MCM together with the microcontroller of the present invention, can be used with a microcontroller of the present invention operating in enhanced mode. However, it should be noted that PORT2 is now a multiplexed bus and will require an address latch similar to PORT0.

5.2 The Expansion Decoder

Figure 6A:
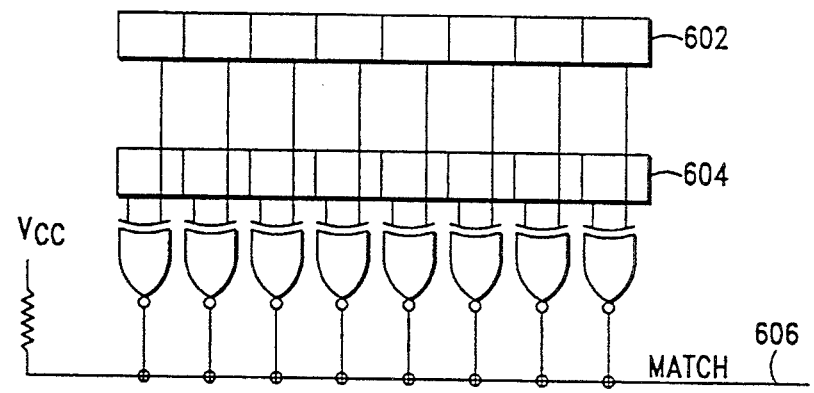
FIGS. 6A-6C show several embodiments of the external SFR address decoder.

Since Expansion I/O Ports 306–314 use SFR addresses that are not implemented on microcontroller 302, it is essential that expansion decoder 304 know which SFR addresses are reserved for use by microcontroller 302 with which it operates, and which SFR addresses are used in the application system. This is complicated by the fact that different microcontrollers use different SFR addresses. There are two solutions to this problem. A first solution is to hardwire the addresses and only use the set of SFR addresses that are not used by any presently existing 8051 family microcontroller. However, this will limit the maximum number of Expansion I/O Ports as well as put severe restrictions on the compatibility of future 8051 family microcontrollers. A preferred solution is to make the external SFR addresses user programmable. User programmability can be achieved by reserving one fixed SFR address in expansion decoder 304. As shown in FIG. 6A, the fixed SFR address, a register 604 in this case, is then loaded from the instruction stream with data that maps (i.e., programs) an address comparator 602, 606 within expansion decoder 304 with an SFR address specified by the user. The Expansion I/O Port addresses then become completely programmable, limited only by the number of address comparators on a specific implementation of expansion decoder 304. In other words, in a limited flexibility implementation, the decoding of external SFR address(es) may be mask-programmed onto expansion decoder 304, while in a more flexible approach, the external SFR address(es) to be decoded are specified to external expansion decoder 304 by stored instructions executed by microcontroller 302, (i.e., under program control). It will be appreciated by those skilled in this field that the external SFR address(es) specified, under program control, for decoding, can be changed at any time under program control.

Figure 6B:
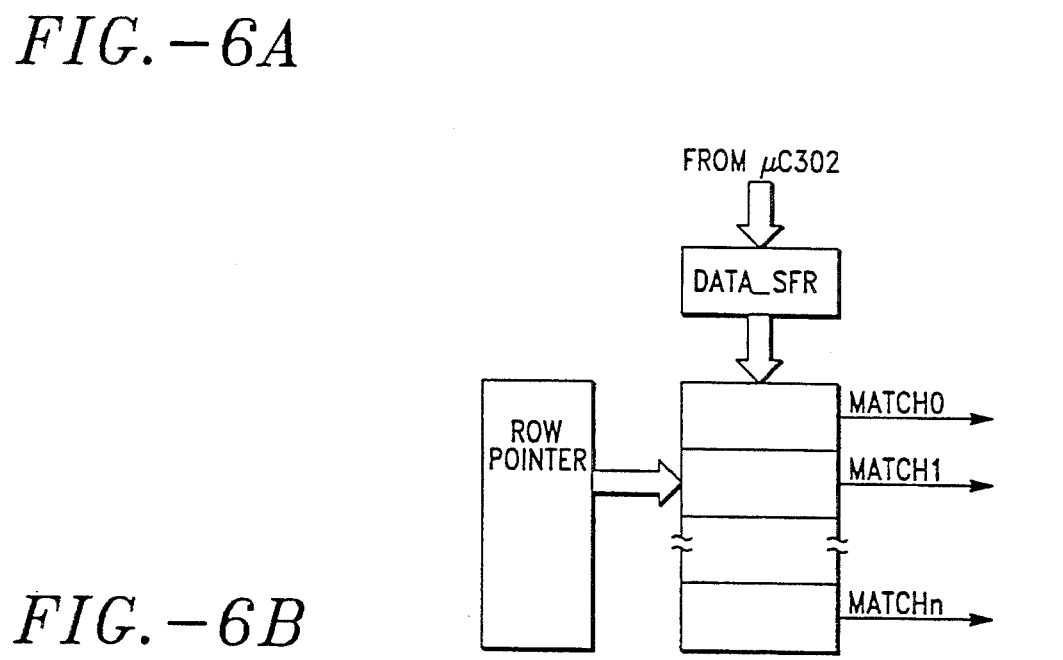

Of course, as shown in FIG. 6B, the external SFR decoding may be done by means of a Content Addressable Memory (CAM) 650 that has a width equal to the number of address bits that the user desires to match, and a depth equal to the user's desired number of external SFRs. This technique is like the well-known method used in microprocessors with on-chip cache tags for determining whether the data from a particular address is present in the cache. In other words, a cache hit signal is the equivalent in the present invention of a valid external SFR address decode. Again, those skilled in the art will recognize that CAM 650 depth may be less than the total number of external SFRs. In this case, CAM 650 will need to be reloaded under program control when the program needs to access an external SFR address which is not in CAM 650. Chip real estate is saved in this way, but performance is degraded.

Figure 6C:
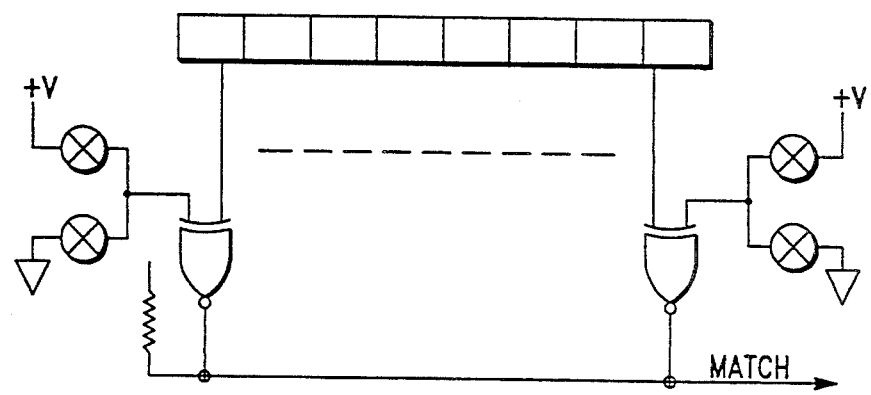

As shown in FIG. 6C, another alternative for decoding SFR addresses in expansion decoder 304 is a hybrid of the mask-programmable approach and the instruction execution controlled approach. In this hybrid approach, Expansion Decoder 304 is provided with one-time programmable hardware such as fuse or anti-fuse circuits. In this way a user may take a standard expansion decoder deuce and program it to decode a specific set of external SFR addresses.

A further alternative for decoding SFR addresses in Expansion Decoder 304 is a to use a CAM 650 as described above, however, programming of CAM 650 is done during a system reset and initialization period by transferring data from a memory means such as a serial EEPROM, a mask-programmed ROM, or any type of non-volatile memory, into CAM 650 rather than programming CAM 650 by means of data moving instructions executed by microcontroller 302. Many other alternative configurations are possible as will be understood by those of skill in the art.

Table III provides a list of the instructions which the expansion decoder will recognize as being capable of operating on an external SFR address. In other words, Expansion Decoder 364 decodes the instruction opcodes listed in Table III and generates the control signals for accessing all the SFRs that are mapped as expansion I/O ports (i.e. external SFR addresses). The opcodes listed in Table III are presented in hexadecimal.

TABLE III

| Instruction Mnemonic | Opcode (Hex) | I/O operation |
| --- | --- | --- |
| ADD A, SFR | 25 | R |
| ADDC A, SFR | 35 | R |
| SUBB A, SFR | 95 | R |
| INC SFR | 05 | RMW |
| DEC SFR | 15 | RMW |
| ANL A, SFR | 55 | R |
| ANL SFR, A | 52 | RMW |
| ANL SFR,#data | 53 | RMW |
| ORL A, SFR | 45 | R |
| ORL SFR, A | 42 | RMW |
| ORL SFR, #data | 43 | RMW |
| XRL A, SFR | 65 | R |
| XRL SFR, A | 62 | RMW |
| XRL SFR, #data | 63 | RMW |
| MOV A, SFR | E5 | R |
| MOV Rn, SFR | A8–AF | R |
| MOV SFR, A | F5 | W |
| MOV SFR, Rn | 88–8F | W |
| MOV SFR, SFR | 85 | R/W |
| MOV SFR, @Rn | 86–87 | W |
| MOV SFR, #data | 75 | W |
| MOV @Ri, SFR | A6–A7 | R |
| PUSH SFR | C0 | R |
| POP SFR | D0 | W |
| XCH A, SFR | C5 | RMW |
| CJNE A, SFR, Roff | B5 | R |
| DJNZ SFR, Roff | D5 | RMW |
| CLR SFR.bit | C2 | RMW |
| SETB SFR.bit | D2 | RMW |
| CPL SFR.bit | B2 | RMW |
| ANL C, SFR.bit | 82 | R |
| ANL C, /SFR.bit | B0 | R |
| ORL C, SFR.bit | 72 | R |
| ORL C, /SFR.bit | A0 | R |
| MOV C, SFR.bit | A2 | R |
| MOV SFR.bit, C | 92 | RMW |
| JB SFR.bit, Roff | 20 | R |
| JNB SFRbit, Roff | 30 | R |
| JBC SFR.bit, Roff | 10 | R,RMW |

Since different I/O architectures may have different requirements as to how fully the address is decoded, six decoding schemes are contemplated by the present invention. Examples of all six are shown in FIGS. 7A–7F using a 20-pin package.

5.3 The Expansion Devices

Expansion I/O Devices 306–314, as mentioned above, can be very simple devices such as input only ports 314, or output only ports 312. Devices of this type are shown in FIG. 3, and are essentially a tri-state buffer in the case of an input-only port and a register in the case of an output-only port. Control signals are provided to these devices by Expansion Decoder 304.

Using an input only port as an example, Expansion Decoder 304 provides a read signal to the port to enable the port to output its data onto PORT2 bus 326, and also provides a signal to /EA pin 320 of microcontroller 302 in order to drive the PORT2 data previously sampled onto internal bus 102 of microcontroller 302.

Expansion I/O Devices having greater complexity can be designed, but all operate with microcontroller 302 and Expansion Decoder 304, within the scope of the present invention, in the same way.

The following chip descriptions should give an idea of the power and flexibility of the present invention. There are many possible peripherals, not including the many combinations and permutations possible with the features and pin counts described in the chips below. The present invention can significantly lower the cost, risk and turn around time for an ASIC. Instead of putting the ASIC functions on the relatively large microcontroller die, they can be integrated separately as an Expansion I/O Port peripheral.

5.3.1 Expansion Data RAM Chip Embodiment

Figure 8:
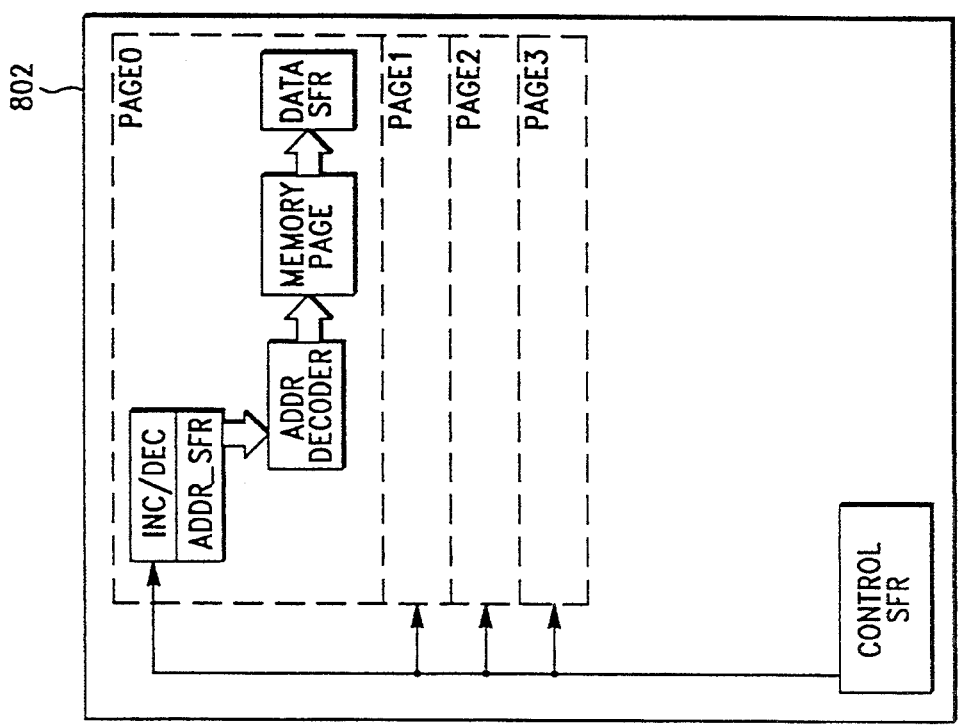
FIG. 8 is an internal block diagram of an expansion memory device.
Figure 5:
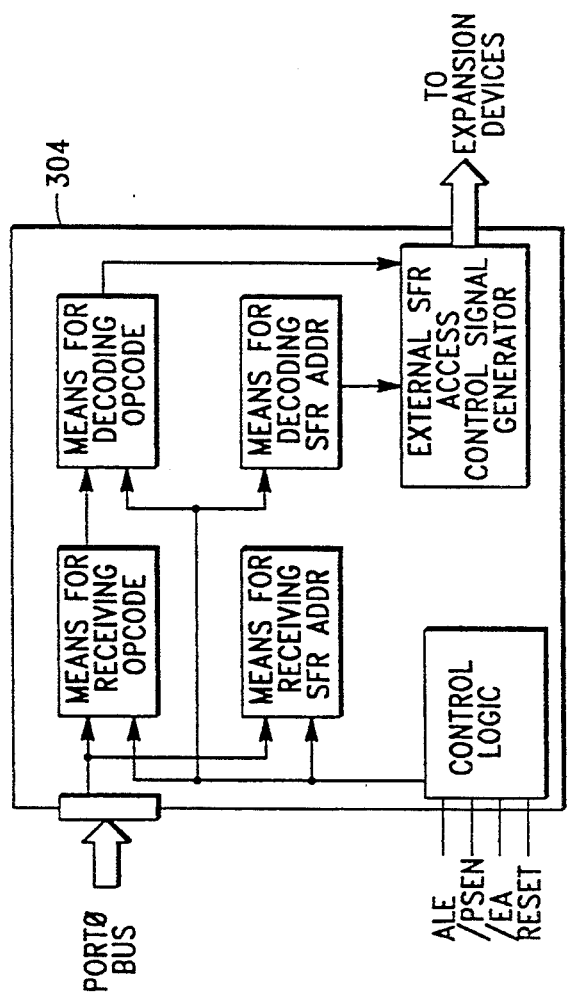
FIG. 5 is an internal block diagram of the Expansion Decoder of the present invention.

An Expansion Data RAM 802 embodiment of the present invention, as shown in FIG. 8, provides for an expanded 8051 internal data memory. More particularly, in a preferred embodiment, such a device has 1024 bytes of RAM (in addition to that which is provided by the 8051 internal memory), and a programmable auto-increment/auto-decrement ability for write/read stack operations. This device can be packaged in a 24-pin package. However, Expansion Data RAM 802 may be combined with additional Expansion I/O ports and packaged in a 40-pin package. Those skilled in the art will recognize that the actual number of I/O ports and package pins is a matter of design choice. Similarly, those skilled in the art will recognize that a memory array size other than 1024 bytes may be used.

In a preferred embodiment of the present invention, the 1024 bytes of RAM are divided into four pages of 256 bytes each. Each page has an Address SFR and a Data SFR. Addresses are loaded in the Address SFR and data is read from or written to the data SFR. This is similar to accessing the upper 128-bytes of on-chip internal data memory. For example, to add a value from the upper 128 bytes to the Accumulator and store it back is done as follows:

MOV R0, variable_address
ADD A, @R0
MOV @R0, A

To do the same thing with Expanded Data Memory the following code segment is used:

MOV page0_adr_reg, variable_address
ADD A, page0_data_reg
MOV page0_data_reg, A

Each page of expanded data memory has a control SFR, or at least one bit in a common SFR that is shared by the pages, that can be programmed to enable and disable the auto-increment or auto-decrement function of the Address SFR. Of course, auto-increment and auto-decrement functionality can be enabled/disabled jointly with one bit of a control SFR, or enabled/disabled separately with more than one bit of a control SFR. This provides for buffer management tasks as well as stack operations. For example, to swap all the nibbles of a buffer using the on-chip RAM could be done as follows:

```
MOV counter,#buffer_length
MOV R0, #buffer_address
loop: MOV A, @R0
  SWAP A
  MOV @R0, A
  INC R0
  DJNZ  counter, loop
```

However, the same function may be coded for expanded data memory having an address register enabled for auto-incrementing after writes, in the following way:

```
MOV counter, #buffer_length
MOV page0-addr-reg, #buffer_address
loop: MOV A, page0_data_reg
  SWAP A
  MOV page0_data_reg, A ;address reg incremented here
  DJNZ  counter, loop
```

Stack functions can be implemented efficiently by programming the Address SFR to auto-increment on reads and auto-decrement on writes. Stack functions can also be implemented by incrementing on writes and decrementing on reads. In this case, incrementing of the address is generally done after the write operation (called post-increment) and decrementing of the address is generally done before the read operation (called pre-decrement).

5.3.2 Expansion Multi-Function Memory Chip

Figure 9:
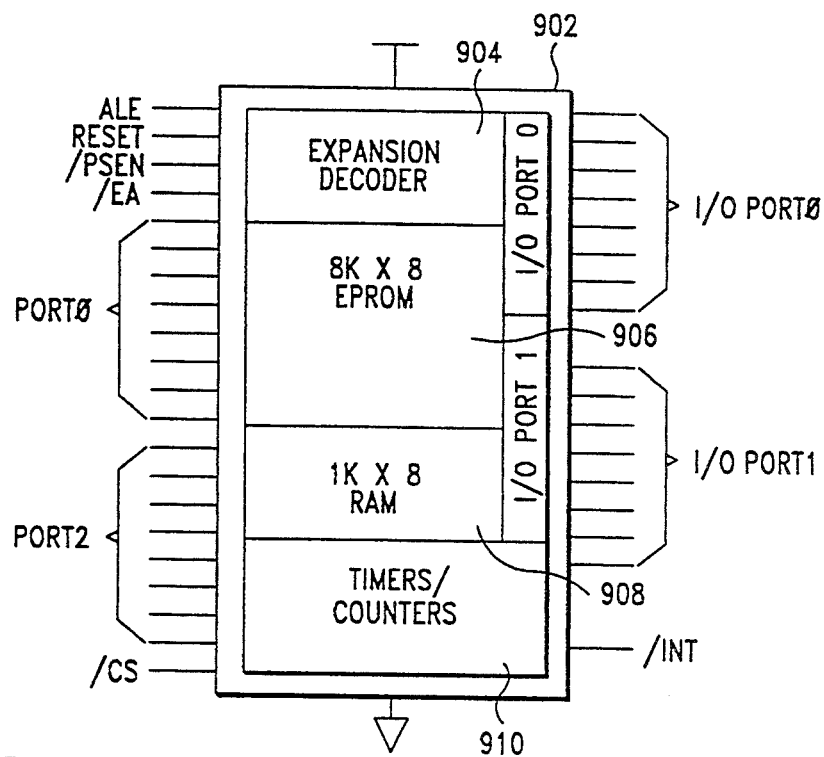
FIG. 9 is an internal block diagram of a multifunction device that incorporates both an expansion decoder block and other functions in a single package.

In a further embodiment of the present invention, an expansion multifunction memory chip (MFC) 902 is used as the expansion I/O device. As shown in FIG. 9, MFC 902 has a non-volatile memory 906 such as an EPROM, EEROM, FLASH memory, CMOS SRAM with battery, ferroelectric memory, or functional equivalent, that is typically configured as an 8K by 8 non-volatile memory array. MFC 902 also has a 1024 byte RAM 908 that serves as an expanded 8051 internal data memory, an expansion decoder logic block, and several timer/counters 910. Still referring to FIG. 9, it can be seen that MFC 902 has signal terminals (e.g. pins) for connection with signals ALE, RESET /PSEN, /EA, /CS, /INT, PORT0, PORT2, I/O PORT0, and I/O PORT1.

In operation, PORT0 and PORT2 are latched internally to MFC 902, in order to address the code memory. As a result of having both of these ports available, it is extremely efficient to integrate expansion decoder 904 onto MFC 902.

Signal terminal /INT is an interrupt output that is asserted as a result of the internal peripheral functions requesting service. Signal terminal /INT is typically coupled to one of the external interrupt request pins of microcontroller 302.

FIG. 9 shows timers/counters 910 implemented on MFC 902, however, any peripheral function that can be accessed via SFRs could be integrated onto MFC 902. For example, Direct Memory Access (DMA) controllers, floating point math units and so on.

6.0 Operational Description

6.1 State by State Operational Example

Figure 10:
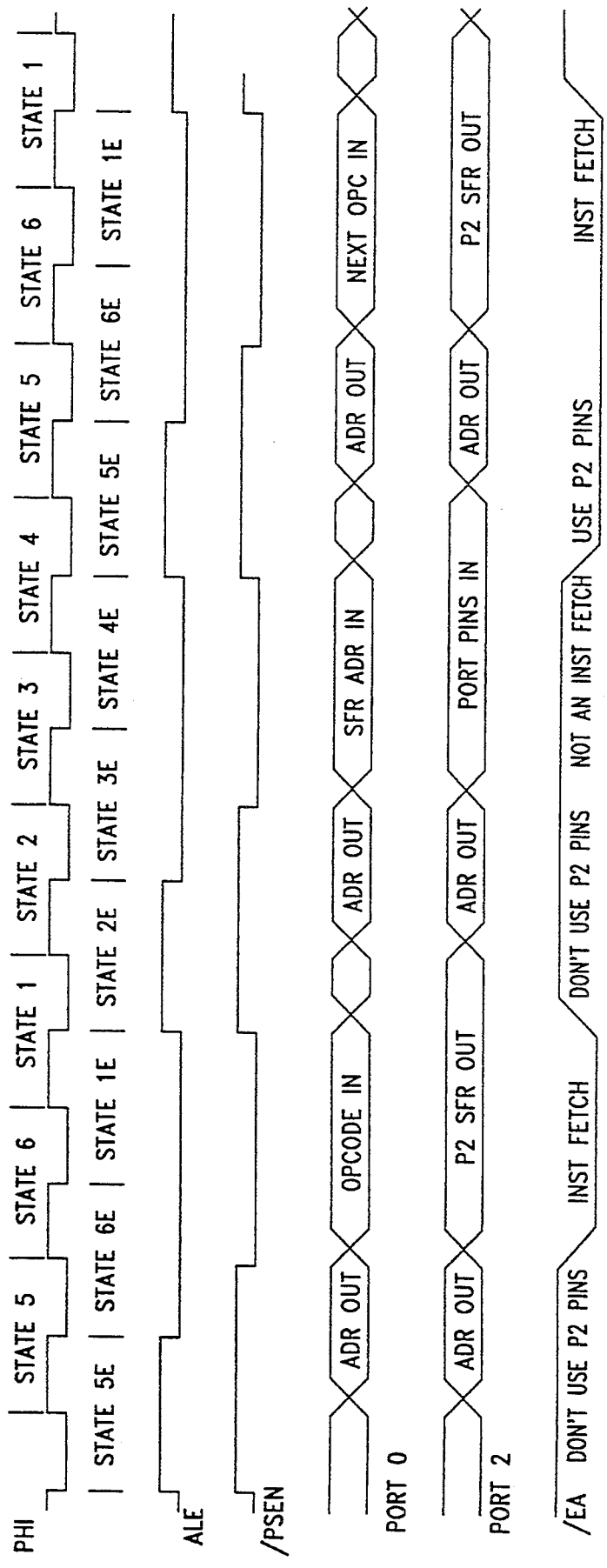
FIG. 10 is a timing diagram illustrating the operation of enhanced mode.

This section, in conjunction with FIG. 10 provides a step by step (i.e., state by state) description of a complete machine cycle. The instruction used for this example is INC EXT_PORT. The address EXT_PORT is an address not implemented on the microcontroller. The notations (O) and (I) used herein represent outputting and input/tristate respectively.

```
                        S5P1
ALE = HIGH
/PSEN = HIGH
PORT0 (O) = LOW BYTE OF ADDRESS BEING DRIVEN
PORT2 (O) = HIGH BYTE OF ADDRESS BEING DRIVEN
/EA (I) = RECEIVING A HIGH FROM EXPANSION DECODER,
    CONTROLLING PORT2 LOGIC SUCH THAT PORT2
    IGNORES SAMPLED PINS
                        S5P2
ALE = LOW
/PSEN = HIGH
PORT0 (O) = LOW BYTE OF ADDRESS BEING DRIVEN
PORT2 (O) = HIGH BYTE OF ADDRESS BEING DRIVEN
/EA (I) = EXPANSION DECODER DRIVING HIGH, PORT2 LOGIC
    IGNORES SAMPLED PINS.
                        S6P1
ALE = LOW
/PSEN = LOW
PORT0 (I) = TRISTATE; WAITING FOR OPCODE
PORT2 (O) = PORT2 SFR BEING DRRVEN
/EA (O) = LOW; i.e., TMS TELLS EXPANSION DEOCDER THAT
    CURRENT BUS CYCLE IS AN INSTRUCTION FETCH
                        S6P2
ALE = LOW
/PSEN = LOW
PORT0 (I) = TRISTATE; WAITING FOR OPCODE
PORT2 (O) = PORT2 SFR TO BE WRRITEN WITH DATA FROM
    MICROCONTROLLER INTERNAL BUS
/EA (O) = LOW; I.E., THIS TELLS EXPANSION DEOCDER THAT
    CURRENT BUS CYCLE IS AN INSTRUCTION FETCH
                        S1P1
ALE = LOW
/PSEN = LOW
PORT0 (I) = INC (05h) OPCODE BEING READ
PORT2 (O) = PORT2 SFR BEING DRIVEN
/EA (O) = LOW; I.E., THIS TELLS EXPANSION DEOCDER THAT
    CURRENT BUS CYCLE IS AN INSTRUCTION FETCH
```

-continued

Note that since /EA is low, the expansion decoder will latch the data on the
PORT0 bus (the INC opcode in the present example) and begin decoding the
instruction at the end of this Phase (IPSEN goes high)

S1P2

ALE = HIGH
/PSEN = HIGH
PORT0 (I) = TRISTATE
PORT2 (O) = PORT2 SFR BEING DRIVEN
/EA (I) = RECEIVING A HIGH FROM EXPANSION DECODER,
   PORT2 LOGIC IGNORES TBE SAMPLED PINS

Note that the expansion decoder never drives /EA low during S1P2, S2P1 or
S2P2, because SFRs are never read during this part of an 8051 machine cycle.

S2P1

ALE = HIGH
/PSEN = HIGH
PORT0 (O) = LOW BYTE OF ADDRESS BEING DRIVEN
PORT2 (O) = HIGH BYTE OF ADDRESS BEING DRIVEN
/EA (I) = RECEIVING A HIGH FROM EXPANSION DECODER,
   PORT2 LOGIC IGNORES THE SAMPLED PINS

S2P2

ALE = LOW
/PSEN = HIGH
PORT0 (O) = LOW BYTE OF ADDRESS BEING DRIVEN
PORT2 (O) = HIGH BYTE OF ADDRESS BEING DRIVEN
/EA (I) = RECEIVING A IRGH FROM EXPANSION DECODER,
   PORT2 LOGIC IGNORES THE SANTLED PINS

S3P1

ALE = LOW
/PSEN = LOW
PORT0 (I) = TRISTATE WAITING FOR NEXT BYTE OF
INSTRUCTION        (SFR ADDRESS)
PORT2 (I) = TRISTATE WAITING FOR SELECTED EXTERNAL ilo
   PORT DATA
/EA (O) = HIGH; THIS IS NOT AN INSTRUCTION FETCH CYCLE Note that /EA driving a high tells the expansion decoder that the current bus
cycle is not an instruction fetch.

S3P2

ALE = LOW
/PSEN = LOW
PORT0(I) = TRI-STATE WAITING FOR NEXT BYTE OF
INSTRUCTION        (SFR ADDRESS)
PORT2 (I) = TRISTATE WAITING FOR SELECTED EXTERNAL I/O
   PORT DATA
/EA (O) = HIGH; TI-HS IS NOT AN INSTRUCTION FETCH CYCLE

S4P1

ALE = LOW
/PSEN = LOW
PORT0 (I) = EXT-PORT (SFR ADDRESS) BYTE BEING READ
PORT2 (I) = SELECTED EXTERNAL I/O PORT DATA BEING
DRIVEN
/EA (O) = HIGH; TI-HS IS NOT AN INSTRUCTION FETCH CYCLE

S4P2

ALE = HIGH
/PSEN = HIGH
PORT0 (I) = TRISTATE
PORT2 (I) = PORT2 PINS BEING SAMPLED
/EA (I) = LOW;

Note that since the expansion decoder decoded an expansion I/O PORT address
and that the current instruction requires a read from the expansion I/O PORT, it
will enable the selected PORT to drive its data onto the PORT2 pins.

S5P1

ALE = HIGH
/PSEN = HIGH
PORT0 (O) = LOW BYTE OF ADDRESS BEING DRIVEN
PORT2 (O) = HIGH BYTE OF ADDRESS BEING DRIVEN
/EA (I) = LOW;

S5P2

ALE = LOW
/PSEN = HIGH
PORT0 (O) = LOW BYTE OF ADDRESS BEING DRIVEN
PORT2 (O) = HIGH BYTE OF ADDRESS BEING DRIVEN
/EA (I) = LOW;

Note that the low on /EA in S4P2 through S5P2 indicates to the PORT2 logic
that data sampled from the PORT2 pins is to be driven onto the internal bus.

S6P1

ALE = LOW
/PSEN = LOW
PORT0 (I) = TRISTATE WAITING FOR NEXT OPCODE
PORT2 (O) = PORT2 SFR BEING DRIVEN
/EA (O) = LOW;

-continued

S6P2

ALE = LOW
/PSEN = LOW
PORT0 (I) = TRISTATE WAITING FOR NEXT OPCODE
PORT2 (O) = PORT2 SFR WILL BE WRITTEN WITH THE
VALUE OF     EXT_PORT INCREMENTED BY 1 (DUE TO
INC          INSTRUCTION)
/EA (O) = LOW;

S1P1

ALE = LOW
/PSEN = LOW
PORT0 (I) = NEXT OPCODE BEING READ
PORT2 (O) = PORT2 SFR (NEW VALUE OF EXT-PORT) BEING
DRIVEN
/EA (O) = LOW;

Note the low at /EA in S6P1 through S1P1 indicates instruction fetch for the next instruction. Since the expansion decoder decoded an expansion I/O PORT address and that the current instruction requires a write to the expansion I/O PORT, it will clock the selected Port to latch the data on the PORT2 pins, which in the above example, is the incremented value.

The foregoing sequence of state cycles shows an external Expansion I/O port being read, modified and written to, with the same performance as any on-chip SFR.

FIG. 3 shows a block diagram of a system using the Enhanced Hooks mode to create Expansion I/O Ports. This figure also illustrates the partition of the Expansion I/O control bus (decoded off PORT0) and Expansion I/O data bus 326 (i.e.; PORT2). This system shows the flexibility of this concept in the great variety of I/O devices that can be supported. It should be noted that since PORT2 is a multiplexed bus in this embodiment of the present invention, address latch 334 is required as shown.

Expansion Decoder 304 controls all the Expansion I/O accesses. Expansion Decoder 304 is a low complexity chip that handles all the functions of instruction and SFR address decoding. Several examples of possible Expansion Decoder 304 implementations are described below.

Expansion Decoder 304 uses three different SFR address decoding methods to support the wide range of I/O chips. Complete decoding with READ and WRITE control signals are best suited for simple Input and Output Ports. Separate Address and Control decoding is preferred for higher integrated I/O Ports with only one or two SFRs like the EP600 (PLD manufactured by Altera) shown in FIG. 3. Highly functional Expansion I/O chips that include many SFR addresses are more efficiently controlled by means of encoded I/O address busses as shown in FIG. 7A.

7.0 Prototyping Method

Microcontroller 302, as described above, provides access to internal bus 102 transactions at specific times during a machine cycle. Expansion decoder 304 of the present invention provides means for decoding instructions and register addresses. Together these features permit a user to create expansion devices (examples of which are also described above). However, since the registers of the expansion devices appear to be internal to microcontroller 302, the result is several physically separate chips that appear to be architecturally seamless. That is they operate, architecturally, as if the expansion device were physically integrated on a single substrate with microcontroller 302.

Using microcontroller 302, expansion decoder 304 and expansion devices 306-314 of the present invention, it is possible to create a highly flexible and relatively low-cost ASIC prototyping system and ;method. Essentially the system of the present invention is used to verify proper operation of peripheral functions before they integrated into a single substrate with the microcontroller. One of ordinary skill in this field will recognize that these peripheral functions can be implemented in a variety of ways for prototyping purposes. For example, Field Programmable Gate Arrays (FPGAs), Programmable Logic Devices (PLDs), ASICs or discrete logic can be used to implement the circuitry of the proposed peripheral function. Since the proposed peripheral function is implemented in hardware (rather than only a software simulation model), full speed testing is possible by use of the present invention which treats (from an architecture and timing point of view) the external hardware implementation of the proposed peripheral function as if it were actually integrated into microcontroller 302.

After desired functionality is confirmed, a new microcontroller containing the expansion device functionality can be manufactured with a high degree of confidence that the single chip implementation will be successful.

8.0 Emulation Support

Although, in terms of unit volume, most microcontrollers are used in what are generally called "applications", a number of these devices find their way into development/debugging tools commonly referred to in this field as in-circuit emulators.

The present invention is particularly useful for implementing an in-circuit emulator for a microcontroller. Since all write data on the internal bus of the microcontroller is visible externally at the PORT2 pins, trace functions, as will be apparent to those of ordinary skill in this field, are much easier to implement.

Figure 13:
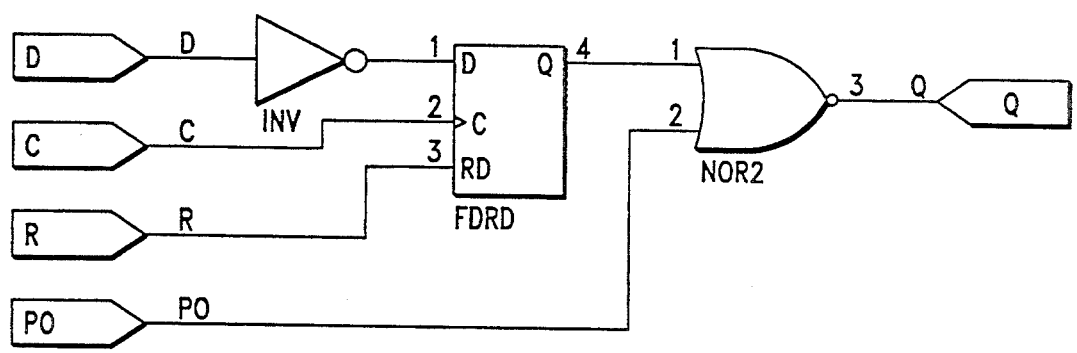
FIGS. 11-13 are a hierarchical description of logic for implemeting recreated ports.
Figure 11:
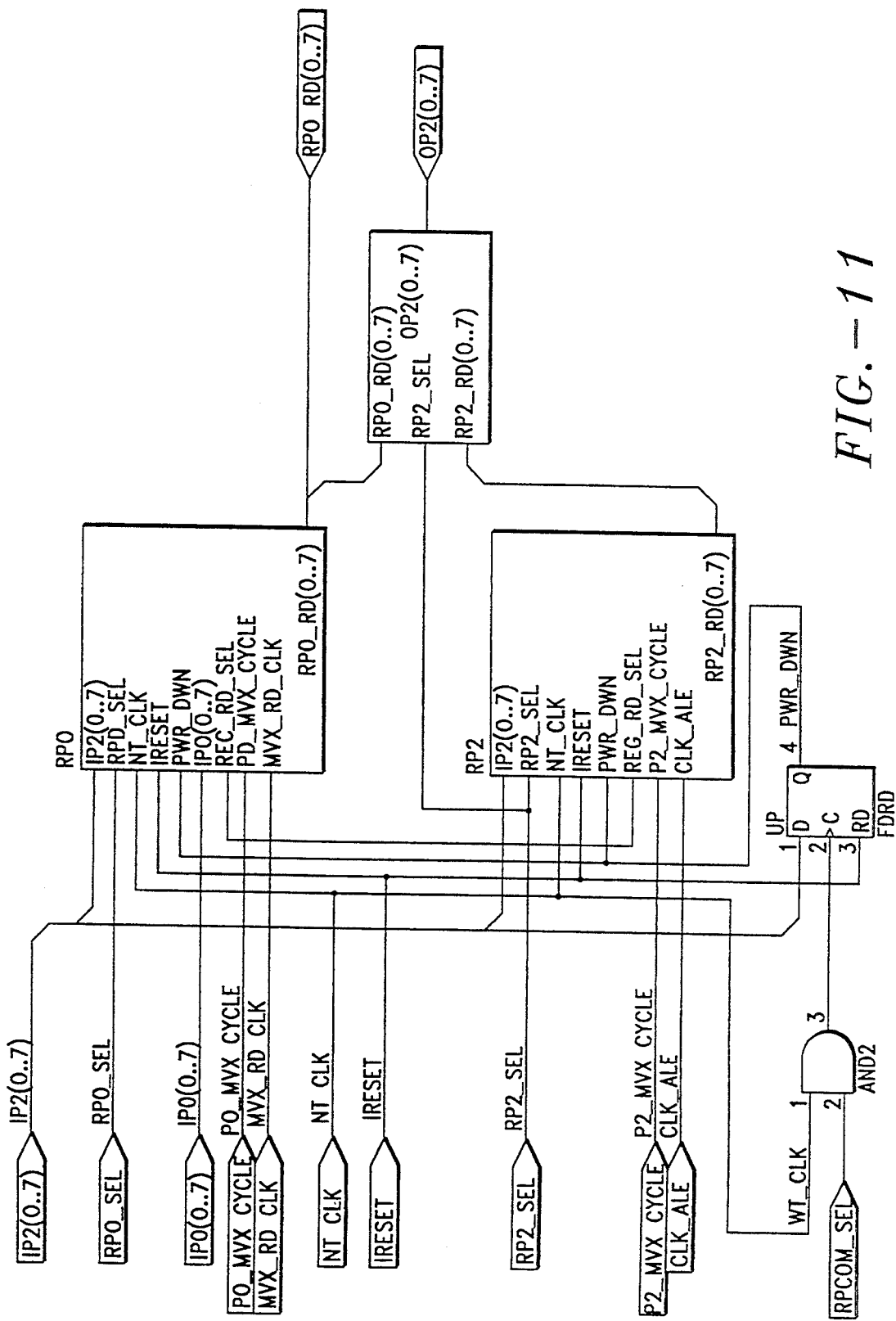
Figure 12A:
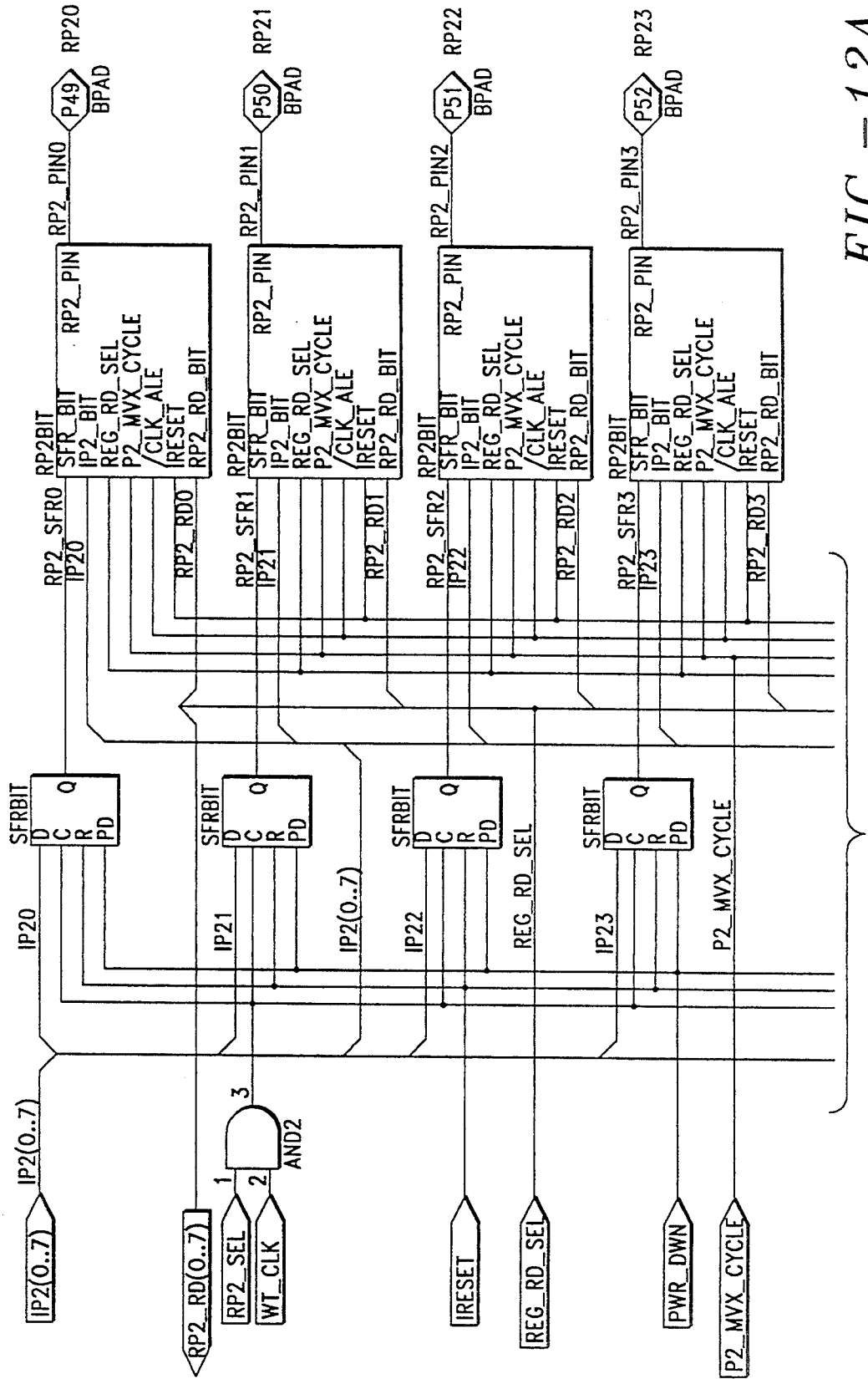
Figure 12B:
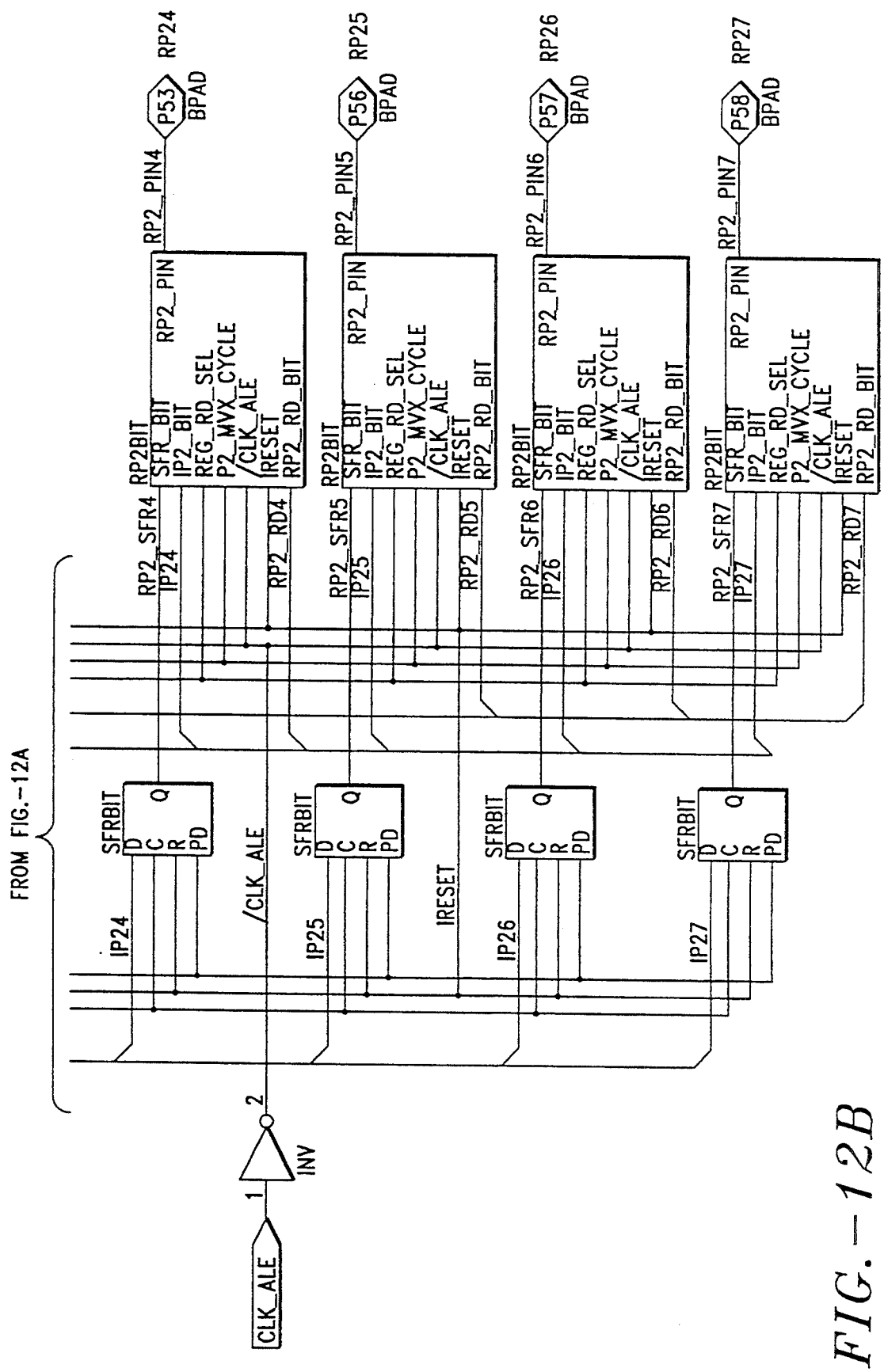

The ease of external recreation of certain internal register bits, such as PORT0, PORT2, and the PCON bits, as shown in FIGS. 11-13, also facilitates implementation of in-circuit emulator designs.

CONCLUSION

Those of ordinary skill in the art will recognize many design choices and tradeoffs that can be selected for use in embodiments of the present invention. For example, although the expansion decoder and expansion I/O devices are referred to as external devices, thus implying chips in separate packages, the present invention contemplates having individual chips combined in a single package such as a Multi-Chip Module (MCM) or the like.

Although the present invention has been described in terms of the presently preferred embodiments, it is to be understood that the disclosure is not to be interpreted as limiting. Various other alterations and modifications will no doubt become apparent to those skilled in the art after having read the above disclosure. Accordingly, it is intended that the subjoined claims be interpreted as covering all alterations and modifications as fall within the true spirit and scope of the invention.

What is claimed is:

1. A computer system comprising:
    a) a microcontroller having machine cycles, an internal bus, at least two I/O ports and a plurality of control signal terminals;
    b) an expansion decoder circuit, coupled to said I/O ports and control signal terminals of said microcontroller, said expansion decoder circuit comprising
        (1) means for synchronizing operations of said expansion decoder with the internal operations of said microcontroller;
        (2) means for receiving an instruction during the same machine cycle as said microcontroller, said instruction including an opcode, fetched from a program memory by said microcontroller and transmitted onto an internal data bus of said microcontroller;
        (3) means for decoding said instruction coupled to said means for receiving said instruction, said means for decoding said instruction operable to produce a signal indicative of whether said opcode represents an instruction that can accept a Special Function Register (SFR) as an operand;
        (4) means for receiving an SFR address fetched from said program memory by said microcontroller and transmitted onto said internal data bus of said microcontroller; and
        (5) means for determining whether said SFR address is equal to one of a predetermined plurality of SFR addresses, wherein said predetermined plurality of SFR addresses correspond to peripheral functions that are physically external to said microcontroller; and
    c) at least one peripheral function, coupled to said microcontroller and said expansion decoder circuit;
    wherein at least one of said I/O ports is adapted to communicate the contents of said internal bus to said expansion decoder at least once during every machine cycle, and said expansion decoder circuit is operable to produce control signals for an external SFR address.

2. The system of claim 1 wherein said means for determining whether said SFR address is equal to one of said predetermined plurality of SFR addresses comprises a non-programmable decoder of external SFR addresses.

3. The system of claim 1 wherein said means for determining whether said SFR address is equal to one of said predetermined plurality of SFR addresses comprises a one-time programmable table of valid external SFR addresses.

4. The system of claim 1 wherein said means for determining whether said SFR address is equal to one of said predetermined plurality of SFR addresses comprises a Content Addressable Memory (CAM).

5. The system of claim 1 wherein said peripheral function comprises at least one register of an external I/O device.

6. The system of claim 5 wherein said external I/O device comprises an expansion memory,
    said expansion memory comprising:
        (1) a memory array having a plurality of bits of memory,
        (2) at least one address SFR coupled to said memory array for receiving address data from said microcontroller, and
        (3) at least one data SFR for communicating data to said memory array from said microcontroller and to said microcontroller from said memory array.

7. The system of claim 6 wherein said memory array comprises 1024 bytes of memory and further comprises four address SFRs, each said address SFR operable to address a mutually exclusive block of 256 bytes of said memory array.

8. The system of claim 6 wherein said address SFRs include logic for incrementing and decrementing their respective contents, said system further comprising a control SFR, said control SFR being writeable by said microcontroller, and wherein said control SFR is operable to produce a plurality of signals for controlling said logic for incrementing and decrementing.

9. The system of claim 1 further comprising a control information circuit, said control information circuit comprising a control signal terminal that electrically couples data received during a reset of said computer system to at least one bit of storage, said at least one bit of storage being at least indicative of said computer system being operated in a mode comprising a mode selected from the group consisting of ROMless mode and ROM mode; said control information circuit further comprising a bi-directional buffer coupled between said control signal terminal and said at least one bit of storage.

10. The system of claim 9 wherein said control information circuit produces a first output signal at said control signal terminal during predetermined portions of a machine cycle internal to said microcontroller, said first output signal being a logic low during an instruction fetch and being a logic high when no instruction is being fetched.

11. The system of claim 1 wherein
    a) if said program memory is internal to said microcontroller, said instructions appear at a first one of said I/O ports with a first timing relationship to said control signals, and
    b) if said program memory is external to said microcontroller, said instructions appear at said first one of said I/O ports with a second timing relationship to said control signals;
    wherein said first and second timing relationships are substantially identical.

12. A method of prototyping a computer system without timing constraints prior to integrating all its logical functions onto a single substrate, said method requiring a microcontroller, having a minimum cycle time, that fetches an instruction stream from at least an external program memory, an expansion decoder comprising said expansion decoder circuit comprising
    (1) means for synchronizing operations of said expansion decoder with the internal operations of said microcontroller;

(2) means for receiving an instruction during the same machine cycle as said microcontroller, said instruction including an opcode, fetched from a program memory by said microcontroller and transmitted onto an internal data bus of said microcontroller;

(3) means for decoding said instruction coupled to said means for receiving said instruction, said means for decoding said instruction operable to produce a signal indicative of whether said opcode represents an instruction that can accept a Special Function Register (SFR) as an operand;

(4) means for receiving an SFR address fetched from said program memory by said microcontroller and transmitted onto said internal data bus of said microcontroller; and (5) means for determining whether said SFR address is equal to one of a predetermined plurality of SFR addresses, wherein said predetermined plurality of SFR addresses correspond to peripheral functions that are physically external to said microcontroller, and a peripheral function device having at least one register, and further having a desired functionality, said method comprising the steps of:

a) selecting a first address wherein said first address is not equal to an address used in an internal address space of said microcontroller;

b) programming said means for performing address comparisons with at least said first address;

c) determining whether there is an SFR address byte accompanying an instruction;

d) coupling said peripheral function device with said microcontroller and said expansion decoder, to form said computer system;

e) fetching instructions under control of said microcontroller;

f) latching and decoding said instructions in said expansion decoder;

g) latching an SFR address if said instruction references a location in SFR space;

h) decoding said SFR address;

i) generating at least one access control signal;

j) communicating said at least one access control signal to said peripheral function device; and k) operating said computer system to verify its functionality.

13. The method of claim 12 wherein said peripheral function device comprises circuitry having a minimum cycle time which is less than or equal to the minimum cycle time of said microcontroller.

14. The method of claim 12 wherein said peripheral function device comprises s Field Programmable Gate Array.

15. The method of claim 12 wherein said peripheral function comprises a Programmable Logic Device.

16. The method of claim 12 wherein said peripheral function comprises an Application Specific Integrated Circuit.

17. The method of claim 12 wherein said computer system is an In-Circuit Emulator.

18. An In-Circuit Emulator comprising:

a) a microcontroller having machine cycles, an internal bus, at least two I/O ports, an interrupt handling facility, and a plurality of control signal terminals;

b) an expansion decoder circuit, coupled to said I/O ports and control signal terminals of said microcontroller, said expansion decoder comprising (1) means for synchronizing operations of said expansion decoder with the internal operations of said microcontroller;

(2) means for receiving an instruction during the same machine cycle as said microcontroller, said instruction including and opcode, fetched from a program memory by said microcontroller and transmitted onto an internal data bus of said microcontroller;

(3) means for decoding said instruction coupled to said means for receiving said instruction, said means for decoding said instruction operable to produce a signal indicative of whether said opcode represents an instruction that can accept a Special Function Register (SFR) as an operand;

(4) means for receiving an SFR address fetched from said program memory by said microcontroller and transmitted onto said internal data bus of said microcontroller; and (5) means for determining whether said SFR address is equal to one of a predetermined plurality of SFR addresses, wherein said predetermined plurality of SFR addresses correspond to peripheral functions that are physically external to said microcontroller;

c) at least one peripheral function, coupled to said microcontroller and said expansion decoder circuit;

d) a means for disabling said interrupt handling facility;

e) at least one recreated port; and f) at least one recreated control register;

wherein at least one of said I/O ports is adapted to communicate the contents of said internal bus to said expansion decoder at least once during every machine cycle, and said expansion decoder circuit produces control signals for an access of an external SFR address.

19. The In-Circuit Emulator of claim 18, further comprising:

a) at least one recreated control register.

* * * * *